Figure 1:
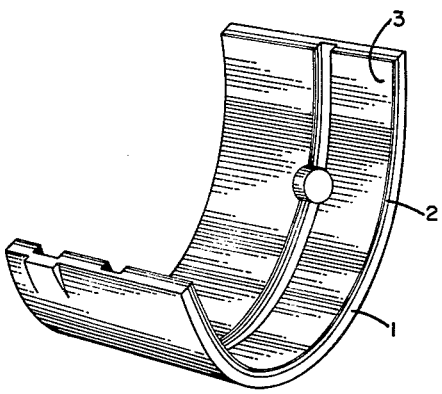

Nov. 2, 1965   R. A. SCHAEFER   3,215,513
BEARING MATERIAL
Filed Jan. 4, 1962

INVENTOR.
RALPH A. SCHAEFER
BY
*Eber J. Hyde*
ATTORNEY

United States Patent Office 3,215,513
Patented Nov. 2, 1965

3,215,513
BEARING MATERIAL
Ralph A. Schaefer, Newtown, Pa., assignor to Clevite Corporation, a corporation of Ohio
Filed Jan. 4, 1962, Ser. No. 164,255
5 Claims. (Cl. 29—194)

This invention pertains to a new and novel bearing material for use as a sleeve bearing, wear plate, thrust washer or the like.

An object of the present invention is to provide a new bearing material and bearings made therefrom, wherein an extremely thin auxiliary flash coating or micro-overlay is used to greatly improve the quality and life of the bearing during operation.

In the past thin-wall bearings have been made of a strong metal backing member with one or more layers of tin or lead base babbitt thereon, and they have also been made of a strong metal backing member to which a sintered porous layer was applied and then a tin or lead base babbitt bearing layer was applied to the porous layer.

It has also been known to apply to the bearing a thin surface layer of a good bearing material to improve the running quality of the bearing during break-in and to prevent quick seizure of the bearing.

The present invention is directed to a bearing of one of the aforesaid types, to the surface of the bearing layer of which there is applied an extremely thin auxiliary layer or micro-overlay of a metal which is not known as a good bearing material, the layer being so thin that it in effect has substantially no independent character of its own, but being sufficiently thick that over a long period of time it enhances the operation of the bearing material even after the wall of the bearing has been worn away an amount much greater than the original thickness of the micro-overlay layer. Such a thin micro-overlay layer probably tends to diffuse into the bearing layer forming a miscible system therewith.

It is, accordingly, an aspect of the present invention to provide a strip of bearing material and bearings made therefrom comprised of a metal backing member such as steel, aluminum or the like, to which is secured one or more layers of bearing material formed of lead base babbitt or of tin base babbitt or formed of lead-tin-copper or the like, cast, sintered or plated thereon, and on the layer of bearing metal there is superimposed a micro-overlay layer of zinc or zinc-tin alloy rich in zinc whose thickness is between about .00005 and .00010 inch. The micro-overlay of zinc or zinc-tin alloy preferably is plated onto the layer of bearing material, though it may also be applied by vacuum evaporation. To increase adhesion a thin layer of plated copper may be deposited on the bearing material before the protective layer is applied. If the micro-overlay is electro-deposited directly on the bearing layer it is best that it be applied from a zinc fluoborate bath.

The thickness of the micro-overlay is critical. Below about .00005 inch the benefits are doubtful and above about .00010 inch the predominantly zinc layer takes on a character of its own instead of modifying the character of the underlying layer of bearing material. This is not good because the zinc is not a good bearing material. Consequently, the layer must be sufficiently thin to prevent the zinc from exerting its own characteristics, yet it must be thick enough that the zinc modifies the action of the underlying layer of bearing material.

The bearing with the micro-overlay may be used as is or it may be annealed in an inert atmosphere. One hundred hours of annealing in oil at 400° F. did not destroy the auxiliary layer's ability to greatly improve the operational characteristics of the bearing.

It has been found that the zinc or zinc-tin flash greatly improves the operational characteristics of the bearing long after wear has removed metal equal to or greater than the thickness of the micro-overlay. The exact mechanism of this extended benefit is not known but it has been shown that the flash layer greatly increases the fatigue resistance of the underlying bearing material and retards wear. Tests indicate that it apparently is the zinc which improves the bearing characteristics, and consequently the micro-overlay should be rich in zinc. However, to improve the throwing power of the plating bath tin may be added in an amount not to exceed 25%.

With reference to the drawing there is shown in FIGURE 1 a typical bearing made from the material which is the subject of this invention. The bearing is an automobile sleeve bearing. The data shown in FIGURES 2, 3, and 4 were derived from tests run on automobile engine sleeve bearings. Reference character 1 indicates the steel or aluminum backing layer, on which is superimposed a layer 2 of bearing material and on which is superimposed a thin zinc-rich layer 3.

Figure 2:
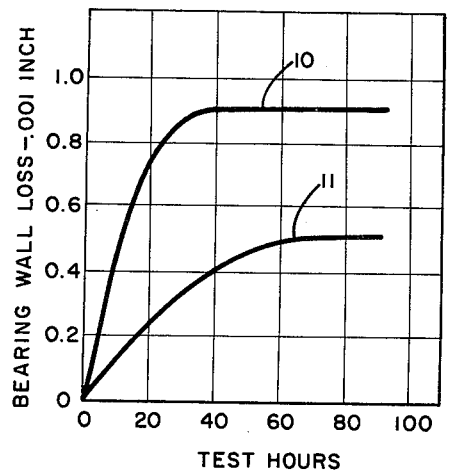

FIGURE 2 is a graph showing the results of an accelerated life test on bearings with and without the protective microoverlay of zinc or zinc-tin. The bearings were identical except for the auxiliary micro-overlay and they comprised a steel backing layer on which was superimposed a first or intermediate layer of copper-lead (about 75% copper, about 25% lead, trace of tin) and an overlay layer of lead-tin-copper (about 10% tin, about 2½% copper, balance lead) was superimposed on the intermediate layer. The test bearings used to obtain the data shown in FIGURE 2 had an overlay layer which was .001″ thick. They were loaded at 3670 p.s.i., were tested at 3500 r.p.m. at a temperature of 300° F. with uninhibited oil. The graph shows the loss in thousandths of an inch from the wall of a connecting rod bearing, and in each graph the maximum loss is indicated; i.e., where the bearing is measured at a number of places the maximum loss is used. The upper curve 10 shows the loss of about .0009″ from a bearing which did not have a zinc or zinc-tin surface flash, and curve 11 shows a loss of only about .0005″ for a comparable bearing which had a zinc surface flash.

Figure 4:
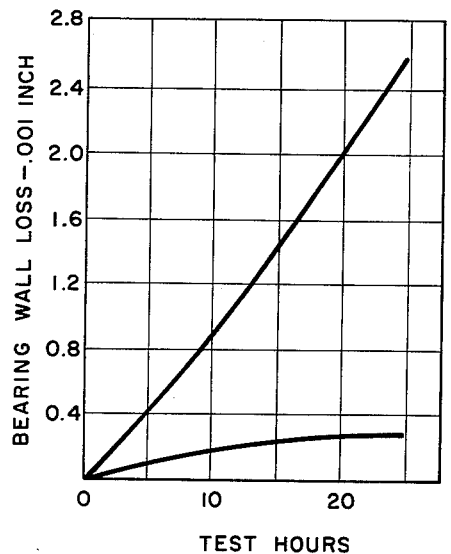
Figure 3:
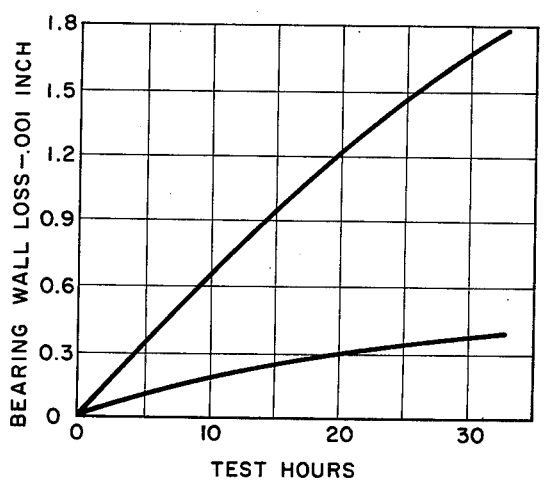

FIGURES 3 and 4 show curves derived from test data obtained from bearings of a type slightly different from the type used to obtain the curves of FIGURE 2. Each of the bearings used to obtain the data shown in FIGURES 3 and 4 had a steel back onto which the overlay bearing material was plated without an intermediate layer. The bearings used to obtain the results shown in FIGURE 3 had an overlay bearing layer .002″ thick and were tested with inhibited oil. The bearings used to obtain the results in FIGURE 4 had an overlay bearing layer .003″ thick and were tested with uninhibited oil. In each instance the lower curve shows results obtained from bearings which had a zinc flash micro-overlay.

The overlay layer should be between .0005″ and .005″ thick, and if an intermediate layer is employed it should be between .005″ and .025″ thick. If the overlay layer is less than .0005″ its embedability is poor, and if it exceeds .005″ in thickness fatigue problems set in which cannot be corrected or substantially improved by the zinc-flash micro-overlay.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

I claim:
1. A strip of bearing material comprising: a metal backing member, at least one layer of bearing metal adhered to said backing member including an overlay layer of bearing material between about .0005″ and .005″ thick and selected from the group consisting of lead-base babbitt, tin-base babbitt, and an alloy having about 87½% lead, 10% tin, 2.5% copper, and superimposed on and adhered to said at least one layer of bearing material a micro-overlay layer of metal selected from the group consisting of zinc and an alloy having at least about 75% zinc and the balance tin and being of a thickness between about .00005 and .00010 inch.

2. A strip of bearing material as set forth in claim 1, further characterized by said micro-overlay layer except for impurities being zinc.

3. A strip of bearing material as set forth in claim 1, further characterized by said bearing metal being selected from a group consisting of cast lead base babbitt and cast tin base babbitt.

4. A strip of bearing material as set forth in claim 1, further characterized by a flash layer of plated copper between and adhered to said layer of bearing material and said micro-overlay layer.

5. A strip of bearing material comprising: a metal backing member, an intermediate layer of bearing material comprised of copper-lead adhered to said backing member and being between about .005 and .025″ thick, an overlay layer of plated lead-tin-copper adhered to said intermediate layer and being between about .0005 and .005″ thick, and a micro-overlay flash layer of zinc-rich material having at least 75% zinc adhered to said overlay layer.

References Cited by the Examiner
UNITED STATES PATENTS

| | | | |
|---|---|---|---|
| 2,038,548 | 4/36 | Domm | 29—196.6 X |
| 2,362,893 | 11/44 | Durst | 29—194 X |
| 2,490,978 | 12/49 | Osterheld | 29—196.5 X |
| 2,968,089 | 1/61 | Fike | 29—183.5 |

DAVID L. RECK, *Primary Examiner.*
HYLAND BIZOT, *Examiner.*